United States Patent
Vavilala et al.

(10) Patent No.: US 11,932,305 B2
(45) Date of Patent: Mar. 19, 2024

(54) STEERING BRACKET FOR CONSTRUCTION MACHINE

(71) Applicant: Caterpillar Inc., Peoria, IL (US)

(72) Inventors: Rajendra Vavilala, Montgomery, IL (US); Brian C. Howson, Bolingbrook, IL (US); William James Hurst, Arlington Heights, IL (US)

(73) Assignee: Caterpillar Inc., Peoria, IL (US)

( * ) Notice: Subject to any disclaimer, the term of this patent is extended or adjusted under 35 U.S.C. 154(b) by 198 days.

(21) Appl. No.: 17/653,013

(22) Filed: Mar. 1, 2022

(65) Prior Publication Data

US 2023/0278628 A1    Sep. 7, 2023

(51) Int. Cl.
*B62D 12/00*    (2006.01)

(52) U.S. Cl.
CPC .................................. *B62D 12/00* (2013.01)

(58) Field of Classification Search
CPC .......... B62D 12/00; B62D 21/18; B62D 5/12; B62D 7/16; B62D 5/001
USPC ........................................................ 280/775
See application file for complete search history.

(56) References Cited

U.S. PATENT DOCUMENTS

| 6,062,334 A * | 5/2000 | Deneve | E02F 3/283 |
| | | | 180/311 |
| 7,188,866 B2 | 3/2007 | Ridgway et al. | |
| 10,927,523 B2 * | 2/2021 | Albers | E02F 3/382 |
| 2007/0240928 A1 * | 10/2007 | Coltson | B62D 9/002 |
| | | | 180/6.24 |
| 2013/0187360 A1 * | 7/2013 | Springer | B60B 35/163 |
| | | | 301/137 |
| 2017/0030051 A1 | 2/2017 | Melchiori et al. | |
| 2021/0245791 A1 | 8/2021 | Krone et al. | |

FOREIGN PATENT DOCUMENTS

| KR | 19980030604 | 8/1998 |
| WO | 2020059764 | 3/2020 |

* cited by examiner

*Primary Examiner* — Paul N Dickson
*Assistant Examiner* — Caitlin Anne Miller

(57) ABSTRACT

A steering bracket for a construction machine includes a body having a first end, a second end opposite the first end, and a body length defined along a longitudinal axis of the body. The body includes an elongate member adapted to be coupled directly with a frame of the construction machine. The elongate member has a first length defined along the longitudinal axis and a first height defined perpendicular to the longitudinal axis. The body also includes a short member adapted to be coupled directly with the frame of the construction machine. The short member is spaced apart from the elongate member in a direction perpendicular to the longitudinal axis. The short member has a second length defined along the longitudinal axis. The second length is less than the first length. The body further includes a plate member coupled between the elongate member and the short member.

20 Claims, 5 Drawing Sheets

STEERING BRACKET FOR CONSTRUCTION MACHINE

TECHNICAL FIELD

The present disclosure relates to a construction machine, and more particularly, to a steering bracket for the construction machine.

BACKGROUND

A construction machine, such as a wheel loader, includes a frame assembly. The frame assembly may support various components of the construction machine including, but not limited to, a power source, an operator cab, and the like. The frame assembly may include a rear frame and a front frame that may articulate relative to the rear frame. Further, the construction machine includes a steering assembly for steering of the construction machine. The steering assembly may include a steering cylinder. One end of the steering cylinder may be coupled to the rear frame and another end may be coupled to the front frame.

Conventionally, the rear frame of the construction machine includes a cast steering bracket that may allow mounting of the steering cylinder on the rear frame. The rear frame may be subjected to side-to-side loading, such as during tough digging applications, and/or steering induced loads. The cast steering bracket may withstand the steering induced loads. However, in order to withstand the side-to-side loading, the rear frame also includes an additional stiffener. The stiffener may be mounted proximate to the cast steering bracket to prevent cracking of the rear frame. However, an addition of the stiffener may increase a part number associated with the construction machine, which may in turn increase a manufacturing and assembly cost associated with the construction machine.

U.S. Pat. No. 7,188,866 describes a steering column assembly that includes a lower support bracket, an upper support bracket, and a jacket disposed within and extending along a longitudinal axis through the lower support bracket and the upper support bracket. The steering column assembly includes a yoke support housing and a plurality of tubes spaced from one another circumferentially about the longitudinal axis and interconnecting the yoke support housing and the upper support bracket. The disclosure includes a method of fabricating the assembly. The steering column assembly provides a high section modulus, improved and predetermined stiffness characteristics, and improved packaging characteristics to hold various components such as ECL mechanisms, steering tube position sensors, BSTI switches, wires and the like.

SUMMARY OF THE DISCLOSURE

In an aspect of the present disclosure, a steering bracket for a construction machine is provided. The steering bracket includes a body having a first end, a second end opposite the first end, and a body length defined along a longitudinal axis of the construction machine. The body includes an elongate member adapted to be coupled directly with a frame of the construction machine. The elongate member has a first length defined along the longitudinal axis and a first height defined perpendicular to the longitudinal axis. The body also includes a short member adapted to be coupled directly with the frame of the construction machine. The short member is spaced apart from the elongate member in a direction perpendicular to the longitudinal axis by a distance. The short member has a second length defined along the longitudinal axis. The second length is less than the first length. The body further includes a plate member coupled between the elongate member and the short member.

In another aspect of the present disclosure, a steering bracket for a construction machine is provided. The steering bracket includes an elongate member adapted to be coupled directly with a frame of the construction machine. The elongate member extends along a longitudinal axis of the construction machine. The elongate member has a first end portion and a second end portion opposite the first end portion. The elongate member has a first length defined along the longitudinal axis and a first height defined perpendicular to the longitudinal axis. The steering bracket also includes a first bracket coupled with the elongate member proximate to the first end portion of the elongate member. The first bracket and the elongate member define a first through-aperture. The steering bracket further includes a short member adapted to be coupled directly with the frame of the construction machine. The short member is disposed proximate to the first end portion of the elongate member. The short member is spaced apart from the elongate member in a direction perpendicular to the longitudinal axis. The short member has a second length defined along the longitudinal axis. The second length is less than the first length. The steering bracket includes a second bracket coupled with the short member. The second bracket and the short member define a second through-aperture, such that the second through-aperture is in alignment with the first through-aperture.

In yet another aspect of the present disclosure, a construction machine is provided. The construction machine includes a frame defining an axle opening. The axle opening has a maximum length defined along a longitudinal axis of the construction machine. The construction machine also includes a steering bracket adapted to be coupled with the frame proximate to the axle opening of the frame. The steering bracket includes a body having a first end, a second end opposite the first end, and a body length defined along a longitudinal axis of the construction machine. The body includes an elongate member adapted to be coupled directly with the frame of the construction machine. The elongate member has a first length defined along the longitudinal axis and a first height defined perpendicular to the longitudinal axis. The body also includes a short member adapted to be coupled directly with the frame of the construction machine. The short member is spaced apart from the elongate member in a direction perpendicular to the longitudinal axis by a distance. The short member has a second length defined along the longitudinal axis. The second length is less than the first length. The body further includes a plate member coupled between the elongate member and the short member.

Other features and aspects of this disclosure will be apparent from the following description and the accompanying drawings.

DETAILED DESCRIPTION

Figure 1:
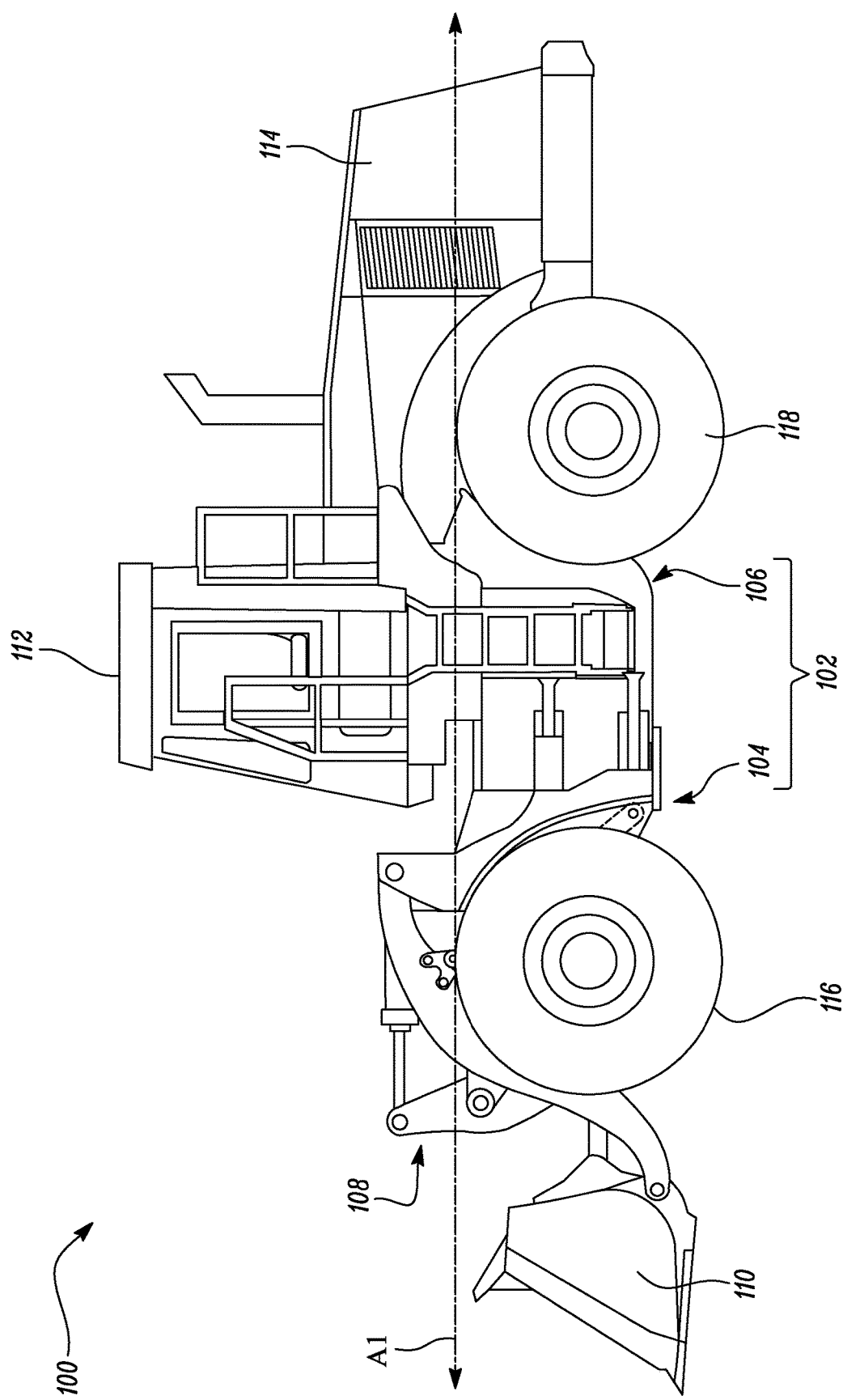
FIG. 1 is a side view of a construction machine, according to an embodiment of the present disclosure.

Wherever possible, the same reference numbers will be used throughout the drawings to refer to the same or like parts. Referring to FIG. 1, a side view of an exemplary construction machine 100 is illustrated. The construction machine 100 is embodied as a wheel loader that may be used for purposes, such as, construction, landscaping, agriculture, and the like. Alternatively, the construction machine 100 may be embodied as an off highway truck, a dozer, an excavator, a tractor, a motor grader, a scraper, etc. that may be used in various industries to move, remove, or load materials, such as, asphalt, debris, dirt, snow, feed, gravel, logs, raw minerals, recycled material, rock, sand, woodchips, etc.

The construction machine 100 defines a longitudinal axis "A1". The construction machine 100 includes a frame assembly 102. The frame assembly 102 may support various components of the construction machine 100. The frame assembly 102 includes a front frame 104 and a rear frame 106. The construction machine 100 also includes a linkage assembly 108. The linkage assembly 108 is movably coupled to the front frame 104. The construction machine 100 also includes an implement 110 that is coupled to the front frame 104 via the linkage assembly 108. The implement 110 is used to perform one or more work operations, such as, loading, stock piling, dumping, and the like.

The construction machine 100 further includes an operator cabin 112 supported by the frame assembly 102. The operator cabin 112 may include one or more controls (not shown), such as, joysticks, pedals, levers, buttons, switches, knobs, audio visual devices, operator consoles, a steering wheel, and the like. The controls may enable an operator to control the construction machine 100 during operation. The construction machine 100 includes a hood 114 mounted on the rear frame 106. Further, the construction machine 100 includes a power source (not shown) supported by the rear frame 106. The power source may be disposed within the hood 114. The power source may include an engine, such as, an internal combustion engine, batteries, motors, and the like. The power source may provide power to various components of the construction machine 100 for operational and mobility requirements. The construction machine 100 further includes a pair of front wheels 116 and a pair of rear wheels 118. The front wheels 116 and the rear wheels 118 provide support and mobility to the construction machine 100 on grounds. Alternatively, the construction machine 100 may include tracks instead of the wheels 116, 118.

Figure 2:
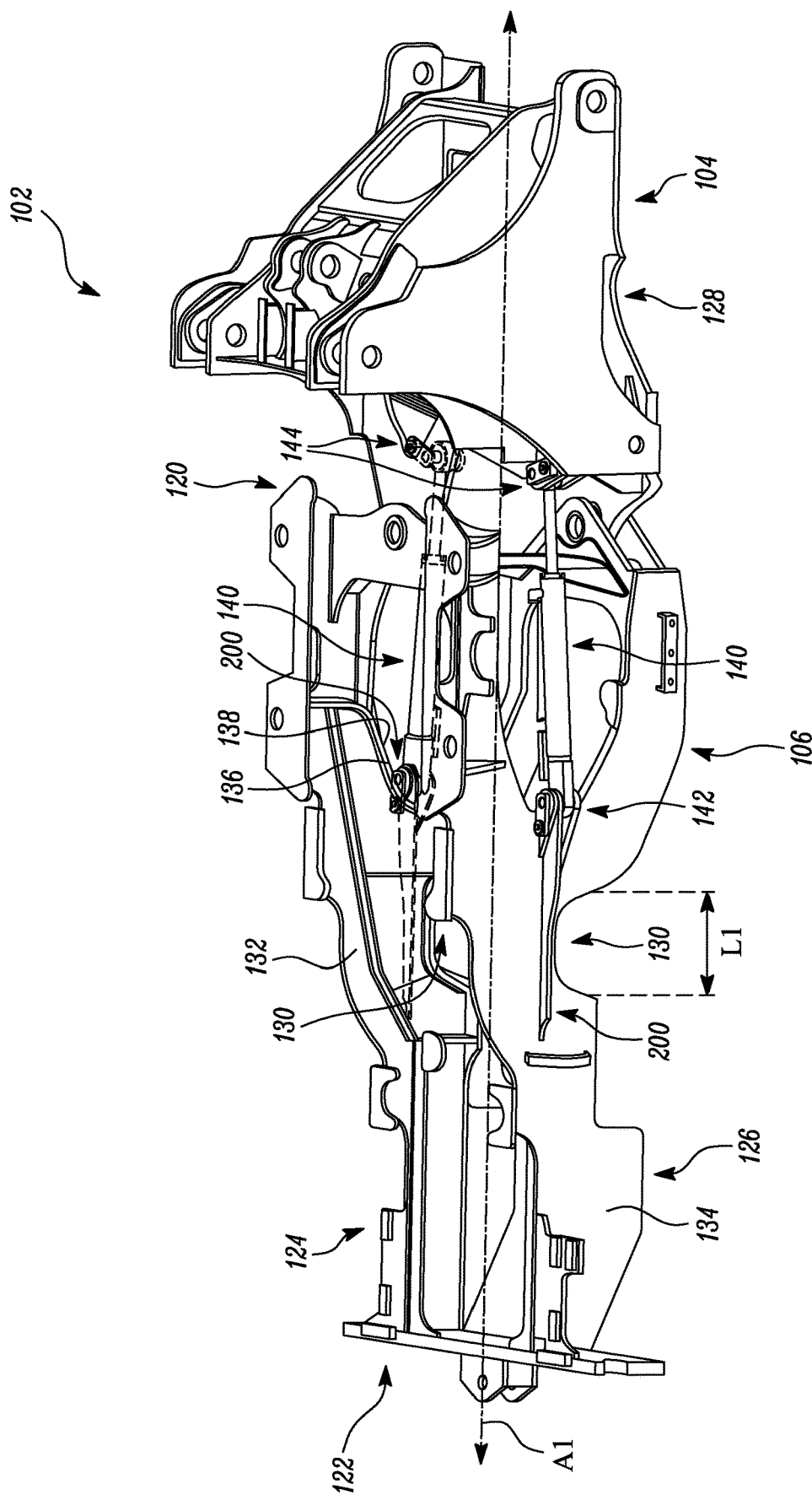
FIG. 2 is a perspective view illustrating a front frame and a rear frame associated with the construction machine of FIG. 1.

Referring to FIG. 2, a perspective view of the frame assembly 102 is illustrated. The front frame 104 includes a mounting 128 for a front axle (not shown). Further, the rear frame 106 may be hereinafter interchangeably referred to as a frame 106. The frame 106 defines a front end 120 and a rear end 122. The frame 106 also defines a first side 124 and a second side 126.

As illustrated in FIG. 2, the front frame 104 is movably coupled to the rear frame 106 proximate to the front end 120 of the rear frame 106. The rear frame 106 supports the power source proximate to the rear end 122. Further, the hood 114 (see FIG. 1) may couple with the rear frame 106 proximate to the rear end 122 for enclosing the power source. The frame 106 defines an axle opening 130. Specifically, the frame 106 defines two axle openings 130, each of which is defined at the first and second sides 124, 126 of the rear frame 106 such that each axle opening 130 may receive a portion of a rear axle (not shown). The axle opening 130 has a maximum length "L1" defined along the longitudinal axis "A1" of the construction machine 100. The rear wheels 118 (see FIG. 1) are coupled with the rear axle.

Further, the frame 106 defines an inner surface 132 and an outside surface 134. The frame 106 also includes a lip 136 extending orthogonally from the inner surface 132 of the frame 106. The lip 136 defines an inside surface 138 (shown in FIG. 5). Further, the inside surface 138 is substantially perpendicular to the outside surface 134.

The construction machine 100 includes a steering bracket 200. In the illustrated embodiment of FIG. 2, the construction machine 100 includes a pair of steering brackets 200. One of the steering brackets 200 is disposed at the first side 124 and another steering bracket 200 is disposed at the second side 126 of the rear frame 106. The steering brackets 200 are similar to each other in design and dimensions. The steering bracket 200 is coupled with the frame 106 proximate to the axle opening 130 of the frame 106. The construction machine 100 also includes a pair of steering actuators 140. One of the steering actuators 140 is disposed at the first side 124 and another steering actuator 140 is disposed at the second side 126 of the rear frame 106.

Each steering actuator 140 includes a cylinder end 142 and a rod end 144. The steering bracket 200 is coupled to a corresponding steering actuator 140 from the pair of steering actuators 140. The cylinder end 142 of each steering actuator 140 is attached to the frame 106 via a first coupling means (not shown) and the rod end 144 of each steering actuator 140 is attached to the front frame 104 via a second coupling means (not shown). Each of the first and second coupling means may include, for example, a plate, a steering pin coupled to the plate, and steering bearings included in the steering actuator 140. Each steering actuator 140 may allow articulation of the front frame 104 relative to the rear frame 106. Further, each steering actuator 140 may extend or retract in order to articulate the front frame 104 relative to the rear frame 106. The steering actuator 140 may include a hydraulic cylinder, a pneumatic cylinder, and the like.

Figure 3:
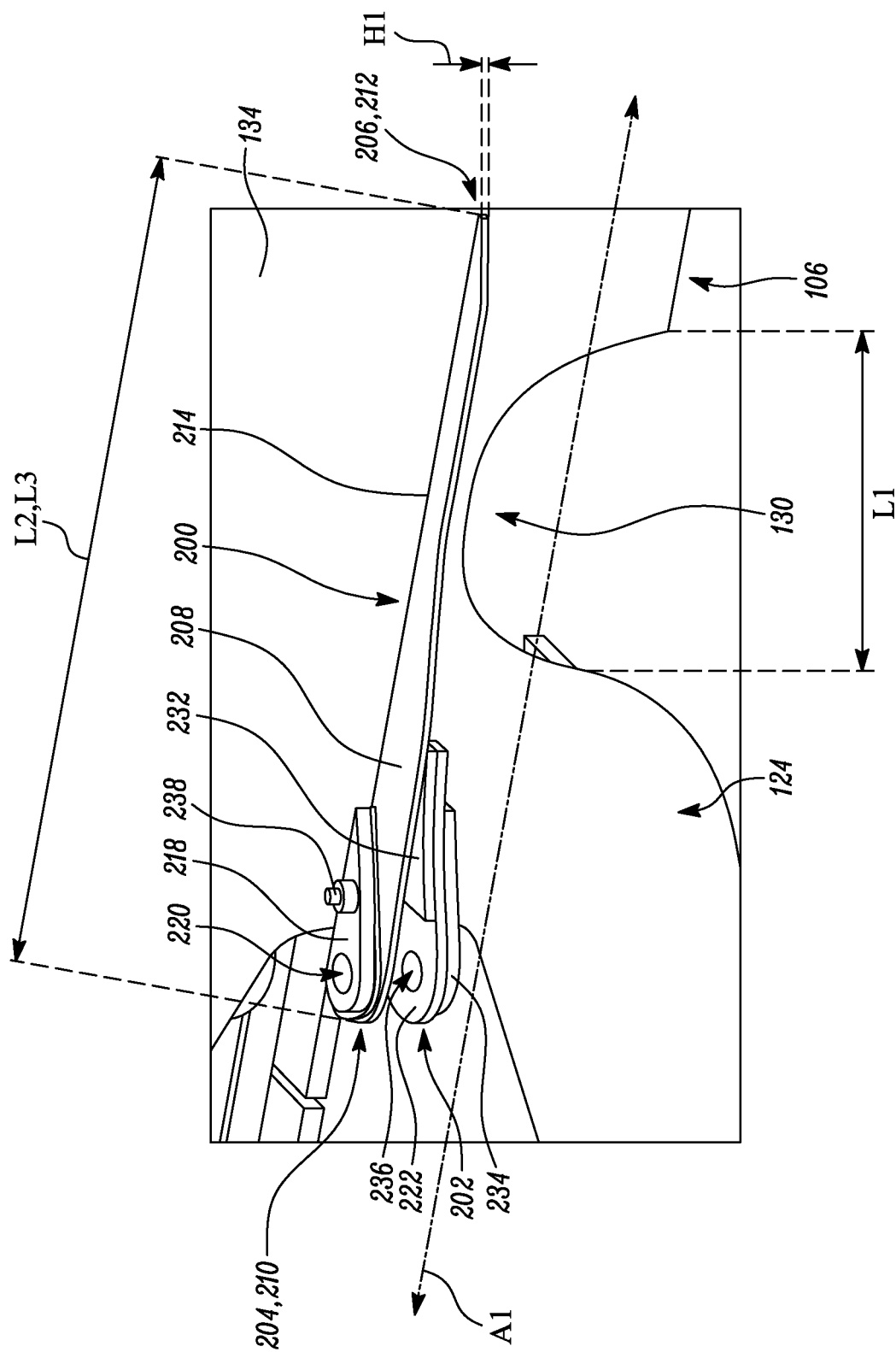
FIG. 3 is a perspective view illustrating a steering bracket coupled to the rear frame, according to an embodiment of the present disclosure.

Referring to FIG. 3, a perspective view of the steering bracket 200 coupled with the rear frame 106 is illustrated. The steering bracket 200 includes a body 202. The body 202 has a first end 204, a second end 206 opposite the first end 204, and a body length "L2" defined along the longitudinal axis "A1" of the construction machine 100. The body 202 includes an elongate member 208. The elongate member 208 is coupled directly with the frame 106 of the construction machine 100. The elongate member 208 extends along the longitudinal axis "A1" of the construction machine 100.

The elongate member 208 has a first end portion 210 and a second end portion 212 opposite the first end portion 210. The first end portion 210 corresponds to the first end 204 of the body 202. Further, the second end portion 212 corresponds to the second end 206 of the body 202. Moreover, the elongate member 208 has a first length "L3" defined along the longitudinal axis "A1" and a first height "H1" defined perpendicular to the longitudinal axis "A1". The first length "L3" of the elongate member 208 corresponds to the body length "L2". In other examples, the first length "L3" of the elongate member 208 may be different from the body length "L2". Further, the first length "L3" of the elongate member 208 may be greater than the maximum length "L1" of the axle opening 130 by a factor of at least 1.5. In some examples, the first height "H1" may be constant along the first length "L3" of the elongate member 208. In other examples, the first height "H1" of the elongate member 208 may vary along the first length "L3" of the elongate member 208, for example, to accommodate one or more components of the construction machine 100.

The elongate member 208 is coupled with the outside surface 134 of the frame 106 and the inside surface 138 (see FIG. 5) of the frame 106. Further, the elongate member 208 defines a surface 214. The surface 214 of the elongate member 208 is coupled with the outside surface 134 of the frame 106. In some embodiments, the elongate member 208 may be coupled with the outside surface 134 of the frame 106 by welding. Alternatively, any other joining technique may be used to couple the elongate member 208 with the outside surface 134.

Figure 4:
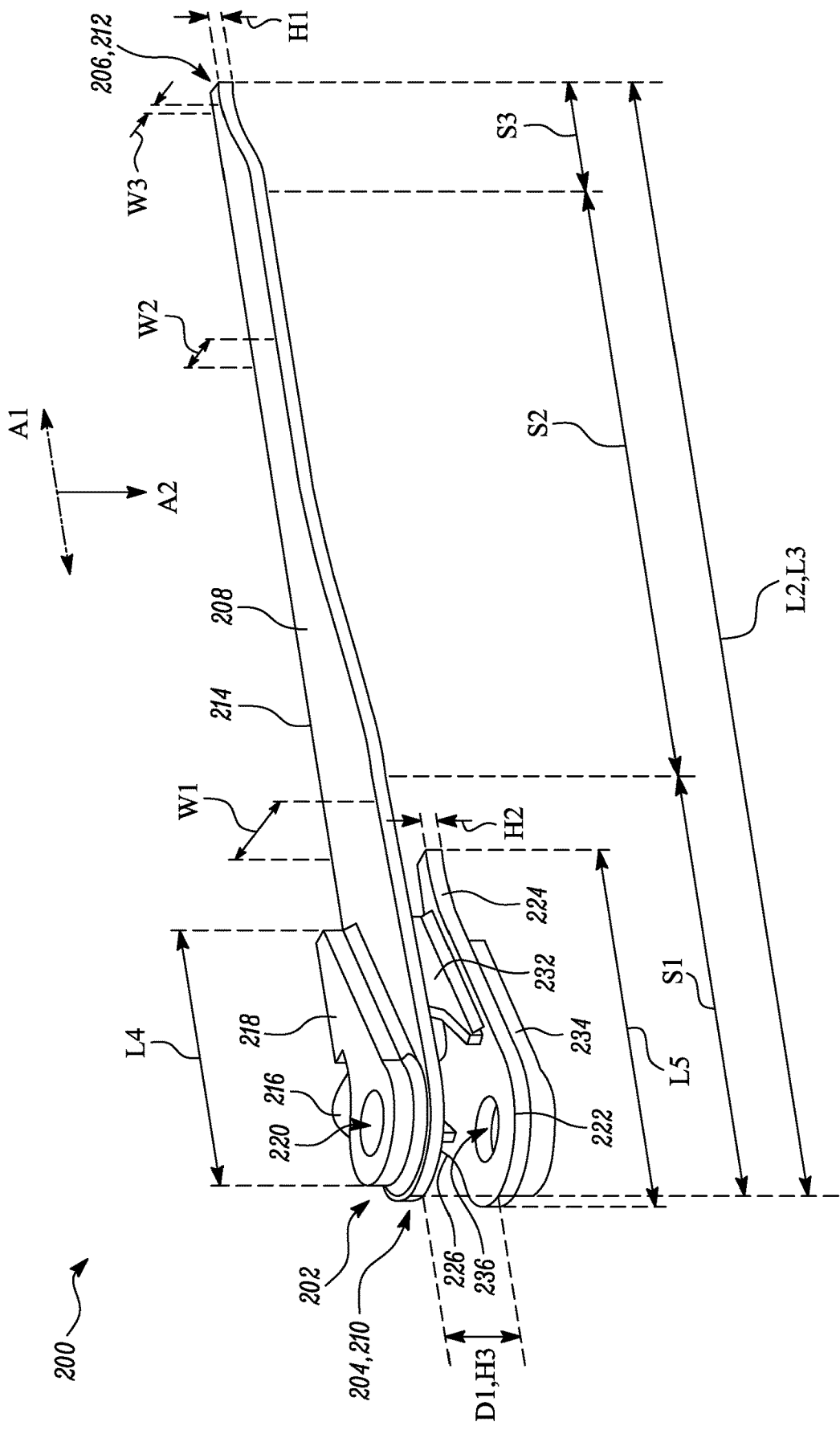
FIG. 4 is a front perspective view of the steering bracket of FIG. 3.

Referring now to FIG. 4, the elongate member 208 includes a projection 216 (also shown in FIG. 5) extending from the surface 214. The projection 216 may be angularly disposed relative to the surface 214. The projection 216 is coupled with the inside surface 138 (see FIG. 5) of the frame 106. Further, the projection 216 is also coupled with the inner surface 132 (see FIG. 5) of the frame 106. In some embodiments, the projection 216 is coupled with the inside surface 138 and the inner surface 132 by welding. Alternatively, any other joining technique may be used to couple the projection 216 with the inside surface 138 and the inner surface 132.

Further, the elongate member 208 includes a first section "S1" defined proximate to the first end 204 of the body 202. Specifically, the first section "S1" is defined proximate to the first end portion 210 of the elongate member 208. The first section "S1" has a first width "W1". The elongate member 208 also includes a second section "S2" disposed adjacent to the first section "S1" in a distal direction in relation to the first end 204 of the body 202. Specifically, the second section "S2" is disposed adjacent to the first section "S1" in the distal direction in relation to the first end portion 210 of the elongate member 208.

The second section "S2" includes a tapering profile at least along a portion of the second section "S2". The tapering profile of the second section "S2" may allow accommodation of the rear axle and/or the rear wheels 118 (see FIG. 1) to prevent any contact of the elongate member 208 with the rear axle and/or the rear wheels 118. Further, the second section "S2" has a minimum width "W2" that is less than the first width "W1". The elongate member 208 may further include a third section "S3" defined proximate to the second end 206 of the body 202. The third section "S3" may have a width "W3" that is less than the minimum width "W2". In some embodiments, the third section "S3" may have a tapered profile or a gradually decreasing width.

The steering bracket 200 also includes a first bracket 218 coupled with the elongate member 208 proximate to the first end 204 of the body 202. Specifically, the first bracket 218 is coupled with the elongate member 208 proximate to the first end portion 210 of the elongate member 208. Further, the first bracket 218 and the elongate member 208 define a first through-aperture 220. The first bracket 218 defines a length "L4". In some examples, the first length "L3" of the elongate member 208 may be greater than the length "L4" of the first bracket 218 by a factor of at least 3. In an example, the first bracket 218 may be coupled with the elongate member 208 by welding. Alternatively, any other joining technique may be used to couple the first bracket 218 with the elongate member 208. Further, the first bracket 218 may be coupled with the outside surface 134 by welding. Alternatively, any other joining technique may be used to couple the first bracket 218 with the outside surface 134. Further, a pin retention boss 238 is coupled with the first bracket 218 to limit a movement of the steering pin. The pin retention boss 238 may be connected to the plate of the first coupling means.

The body 202 also includes a short member 222. The short member 222 is disposed proximate to the first end portion 210 of the elongate member 208. The short member 222 is coupled directly with the frame 106 of the construction machine 100. The short member 222 is coupled with the outside surface 134 and the inside surface 138. The short member 222 is spaced apart from the elongate member 208 in a direction "A2" perpendicular to the longitudinal axis "A1" by a distance "D1". Further, the first height "H1" of the elongate member 208 is less than the distance "D1" defined between the elongate member 208 and the short member 222.

The short member 222 has a second length "L5" defined along the longitudinal axis "A1". The second length "L5" is less than the first length "L3". In some examples, the first length "L3" may be greater than the second length "L5" by a factor of at least 2.5. Further, the short member 222 has a second height "H2" defined perpendicular to the longitudinal axis "A1". In some examples, the second height "H2" may be constant along the length "L5" of the short member 222. In some embodiments, the second height "H2" of the short member 222 may be equal to the first height "H1" of the elongate member 208. Further, in some embodiments, the second height "H2" of the short member 222 may be different from the first height "H1" of the elongate member 208.

The short member 222 defines a first portion 224 and a second portion 226. The first portion 224 and the second portion 226 are angularly disposed relative to each other. The first portion 224 is coupled with the outside surface 134 of the frame 106. In some examples, the first portion 224 is coupled with the outside surface 134 of the frame 106 by welding. Alternatively, any other joining technique may be used to couple the first portion 224 with the outside surface 134 of the frame 106.

Figure 5:
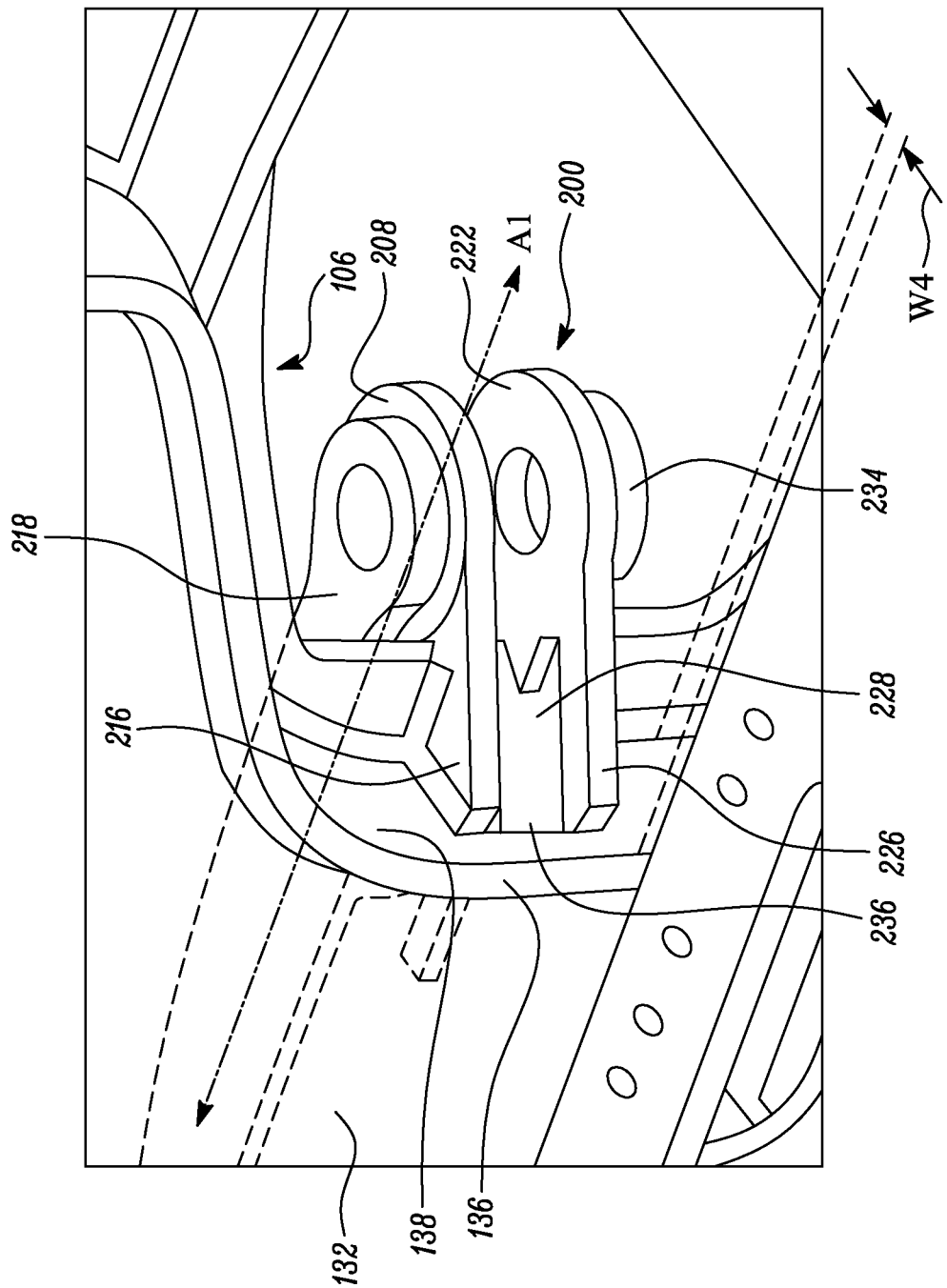
FIG. 5 is a side perspective view of a portion of the steering bracket of FIG. 3.

Referring now to FIG. 5, the second portion 226 of the short member 222 is coupled with the lip 136. More specifically, the second portion 226 is coupled with the inside surface 138. In some examples, the second portion 226 and the projection 216 may be coupled with the inside surface 138 such that the second portion 226 and the projection 216 may extend along more than half of a width "W4" of the lip 136. Further, the second portion 226 and the projection 216 may also be coupled with the inner surface 132 of the frame 106. In some examples, the second portion 226 is coupled with the inside surface 138 of the frame 106 by welding. Alternatively, any other joining technique may be used to couple the second portion 226 with the inside surface 138.

The body 202 of the steering bracket 200 further includes a back plate 228. The back plate 228 extends between the projection 216 of the elongate member 208 and the second portion 226 of the short member 222. In some embodiments, the back plate 228 is coupled with the projection 216 and the short member 222 by welding. Alternatively, any other joining technique may be used to couple the back plate 228 with the projection 216 and the short member 222. The back plate 228 defines an end surface 230. The back plate 228 is coupled with the inside surface 138 proximate to the end surface 230 by welding or any other joining technique, without any limitations.

Referring again to FIG. 4, the steering bracket 200 includes a plate member 232 coupled between the elongate member 208 and the short member 222. The plate member 232 is coupled with the elongate member 208 and the short member 222 by welding. Alternatively, any other joining technique may be used to couple the plate member 232 with the elongate member 208 and the short member 222. The plate member 232 has a height "H3" defined in the direction "A2" perpendicular to the longitudinal axis "A1". The first height "H1" of the elongate member 208 may be less than the height "H3" of the plate member 232.

As illustrated in FIG. 4, the steering bracket 200 further includes a second bracket 234 coupled with the short member 222. The second bracket 234 is coupled with the short member 222 proximate to the first end 204 of the body 202. The second bracket 234 is disposed proximate to the first end portion 210 of the elongate member 208. In some examples, the second bracket 234 may be coupled with the short member 222 by welding. Alternatively, any other joining technique may be used to couple the second bracket 234 with the short member 222. In some examples, the first bracket 218 and the second bracket 234 may have similar design and dimensions. Alternatively, the first bracket 218 and the second bracket 234 may have different design and dimensions. Further, each of the first bracket 218 and the second bracket 234 are coupled with the outside surface 134. The first bracket 218 and the second bracket 234 may be coupled with the outside surface 134 (see FIG. 3) by welding.

The second bracket 234 and the short member 222 defines a second through-aperture 236. The second through-aperture 236 is in alignment with the first through-aperture 220. Further, the first and second through-apertures 220, 236 may align with a through-aperture (not shown) in a bracket disposed at the cylinder end 142 (see FIG. 2) of the steering actuators 140 (see FIG. 2) for receiving the steering pin.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The steering bracket 200 of the present disclosure includes a simple design. The steering bracket 200 described herein is embodied as a fabricated structure and various components of the steering bracket 200 may be welded to each other. The steering bracket 200 may provide a rigid and robust support to the steering actuator 140. The steering bracket 200 may be designed to withstand high stresses, steering loads, and side-to-side loading that may be experienced by the frame 106 during tough digging applications. Further, the steering bracket 200 described herein may combine the functionality of a conventional steering bracket and conventional stiffeners, thereby eliminating the requirement of additional stiffeners. Thus, the steering bracket 200 may reduce part numbers associated with the construction machine 100. Further, the steering bracket 200 may also reduce manufacturing and assembly cost associated with the additional stiffeners.

A design of the elongate member 208 may allow uniform distribution of loads across the frame 106, which may prevent cracking of the frame 106. Further, the elongate member 208 includes a gradually decreasing width from the first end portion 210 towards the second end portion 212 that may create a softening effect to reduce high stress concentration at the second end portion 212 of the elongate member 208. Furthermore, the tapering profile of the elongate member 208 may also contribute towards uniform stress distribution across the elongate member 208, which may prevent the steering bracket 200 from failure. Moreover, the tapering profile of the second section "S2" of the elongate member 208 may allow sufficient clearance between the steering bracket 200 and the rear wheels 118, so that the rear wheels 118 do not contact the steering bracket 200.

Further, due to the axle opening 130, a portion of the frame 106 that is proximate to the axle opening 130 may have a reduced cross-section. The frame 106 may be subjected to high stresses, such as, during side-to-side loading at the reduced cross-section. Thus, the first length "L3" of the elongate member 208 may be decided such that a portion of the elongate member 208 is disposed above the axle opening 130 to ensure adequate strength to the frame 106 at the reduced cross-section.

Further, the first bracket 218, the short member 222, and the second bracket 234 may also be designed to withstand contact loads from the steering pin. In an example, the location at which the second portion 226 of the short member 222 and the projection 216 of the elongate member 208 terminate along the width "W4" of the lip 136 may align with the inner surface 132. This feature may facilitate a weld joint of high strength. Moreover, the plate member 232 and the back plate 228 may act as locators and may also reduce weld distortions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A steering bracket for a construction machine, the steering bracket comprising:
a body having a first end, a second end opposite the first end, and a body length defined along a longitudinal axis of the construction machine, the body including:
an elongate member adapted to be coupled directly with a frame of the construction machine, the elongate member having a first length defined along the longitudinal axis and a first height defined perpendicular to the longitudinal axis;
a short member adapted to be coupled directly with the frame of the construction machine, the short member being spaced apart from the elongate member in a direction perpendicular to the longitudinal axis by a distance, the short member having a second length defined along the longitudinal axis, the second length being less than the first length; and
a plate member coupled between the elongate member and the short member.

2. The steering bracket of claim 1 further comprising:
a first bracket coupled with the elongate member proximate to the first end of the body, the first bracket and the elongate member defining a first through-aperture; and a second bracket coupled with the short member proximate to the first end of the body, the second bracket and the short member defining a second through-aperture, such that the second through-aperture is in alignment with the first through-aperture.

3. The steering bracket of claim 1, wherein the steering bracket is adapted to be coupled with the frame of the construction machine proximate to an axle opening of the frame, wherein the axle opening has a maximum length defined along the longitudinal axis of the construction machine; and wherein the first length of the elongate member is greater than the maximum length of the axle opening by a factor of at least 1.5.

4. The steering bracket of claim 1, wherein the first height of the elongate member is less than the distance defined between the elongate member and the short member.

5. The steering bracket of claim 1, wherein the elongate member includes:
 a first section defined proximate to the first end of the body, the first section having a first width; and
 a second section disposed adjacent to the first section in a distal direction in relation to the first end of the body, the second section including a tapering profile at least along a portion of the second section, the second section having a minimum width that is less than the first width.

6. The steering bracket of claim 1, wherein the plate member is coupled with the elongate member and the short member by welding.

7. The steering bracket of claim 1, wherein the steering bracket is adapted to couple a steering actuator of the construction machine with the frame of the construction machine.

8. A steering bracket for a construction machine, the steering bracket comprising:
 an elongate member adapted to be coupled directly with a frame of the construction machine, the elongate member extending along a longitudinal axis of the construction machine, the elongate member having a first end portion and a second end portion opposite the first end portion, the elongate member having a first length defined along the longitudinal axis and a first height defined perpendicular to the longitudinal axis;
 a first bracket coupled with the elongate member proximate to the first end portion of the elongate member, wherein the first bracket and the elongate member define a first through-aperture;
 a short member adapted to be coupled directly with the frame of the construction machine, the short member being disposed proximate to the first end portion of the elongate member, the short member being spaced apart from the elongate member in a direction perpendicular to the longitudinal axis by a distance, the short member having a second length defined along the longitudinal axis, the second length being less than the first length; and
 a second bracket coupled with the short member, the second bracket and the short member defining a second through-aperture, such that the second through-aperture is in alignment with the first through-aperture.

9. The steering bracket of claim 8 further comprising a plate member coupled between the elongate member and the short member, wherein the plate member is coupled with the elongate member and the short member by welding.

10. The steering bracket of claim 9, wherein the first height of the elongate member is less than the distance defined between the elongate member and the short member.

11. The steering bracket of claim 8, wherein the steering bracket is adapted to be coupled with the frame of the construction machine proximate to an axle opening of the frame, wherein the axle opening has a maximum length defined along the longitudinal axis of the construction machine; and wherein the length of the elongate member is greater than the maximum length of the axle opening by a factor of at least 1.5.

12. The steering bracket of claim 8, wherein the elongate member includes:
 a first section defined proximate to the first end portion of the elongate member, the first section having a first width; and
 a second section disposed adjacent to the first section in a distal direction in relation to the first end portion of the elongate member, the second section including a tapering profile at least along a portion of the second section, the second section having a minimum width that is less than the first width.

13. The steering bracket of claim 8, wherein the steering bracket is adapted to couple a steering actuator of the construction machine with the frame of the construction machine.

14. A construction machine comprising:
 a frame defining an axle opening, the axle opening having a maximum length defined along a longitudinal axis of the construction machine; and
 a steering bracket adapted to be coupled with the frame proximate to the axle opening of the frame, the steering bracket including:
  a body having a first end, a second end opposite the first end, and a body length defined along a longitudinal axis of the construction machine, the body comprising:
   an elongate member adapted to be coupled directly with the frame of the construction machine, the elongate member having a first length defined along the longitudinal axis and a first height defined perpendicular to the longitudinal axis;
   a short member adapted to be coupled directly with the frame of the construction machine, the short member being spaced apart from the elongate member in a direction perpendicular to the longitudinal axis by a distance, the short member having a second length defined along the longitudinal axis, the second length being less than the first length; and
   a plate member coupled between the elongate member and the short member.

15. The construction machine of claim 14 further comprising:
 a first bracket coupled with the elongate member proximate to the first end of the body, the first bracket and the elongate member defining a first through-aperture; and
 a second bracket coupled with the short member proximate to the first end of the body, the second bracket and the short member defining a second through-aperture, such that the second through-aperture is in alignment with the first through-aperture.

16. The construction machine of claim 14, wherein the first length of the elongate member is greater than the maximum length of the axle opening by a factor of at least 1.5.

17. The construction machine of claim 14, wherein the first height of the elongate member is less than the distance defined between the elongate member and the short member.

18. The construction machine of claim 14, wherein the elongate member includes:
- a first section defined proximate to the first end of the body, the first section having a first width; and
- a second section disposed adjacent to the first section in a distal direction in relation to the first end of the body, the second section including a tapering profile at least along a portion of the second section, the second section having a minimum width that is less than the first width.

19. The construction machine of claim 14, wherein the plate member is coupled with the elongate member and the short member by welding.

20. The construction machine of claim 14, wherein:
- the elongate member is coupled with an outside surface of the frame and an inside surface of the frame, the inside surface being substantially perpendicular to the outside surface;
- the short member is coupled with the outside surface and the inside surface; and
- each of the first bracket and the second bracket are coupled with the outside surface.

* * * * *